United States Patent [19]

Fricano

[11] Patent Number: 5,685,258
[45] Date of Patent: Nov. 11, 1997

[54] CANINE CAR SEAT

[76] Inventor: Phillip J. Fricano, P.O. Box 4571, Scottsdale, Ariz. 85261

[21] Appl. No.: 674,822

[22] Filed: Jul. 3, 1996

[51] Int. Cl.$^6$ ................................................. A01K 1/035
[52] U.S. Cl. ..................................... 119/28.5; 119/771
[58] Field of Search ........................ 119/28.5, 770, 119/771, 857, 165, 453; 297/253, 256.15, 256.16

[56] References Cited

U.S. PATENT DOCUMENTS

| | | | |
|---|---|---|---|
| 4,597,359 | 7/1986 | Moorman | 119/28.5 |
| 5,033,409 | 7/1991 | Langenbahn | 119/28.5 |
| 5,479,892 | 1/1996 | Edwards | 119/771 |
| 5,551,373 | 9/1996 | O'Donnell | 119/28.5 |

Primary Examiner—Robert P. Swiatek
Assistant Examiner—Yvonne R. Abbott
Attorney, Agent, or Firm—Tod R. Nissle, P.C.

[57] ABSTRACT

An animal seat is shaped and dimensioned to facilitate the removable securing of the animal seat in position on an existing seat in an automobile or other vehicle.

1 Claim, 1 Drawing Sheet

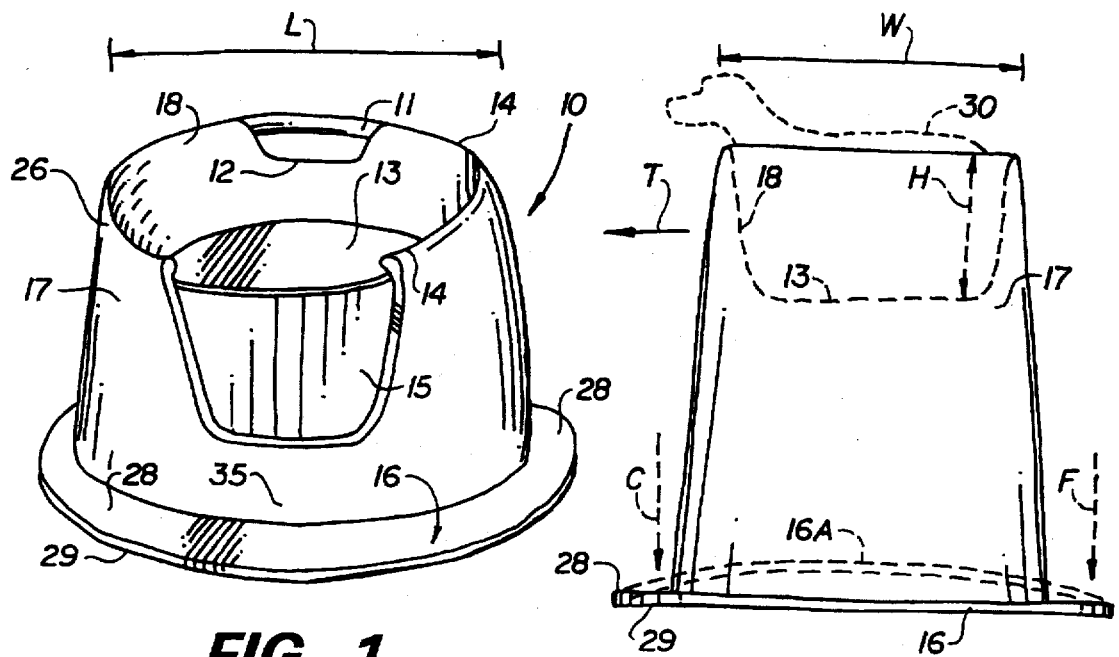
FIG. 1
FIG. 2
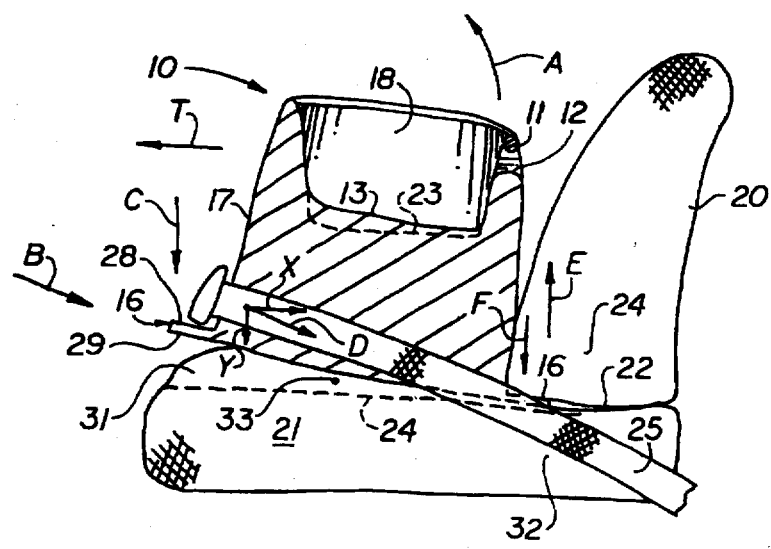
FIG. 3

CANINE CAR SEAT

This invention relates to a vehicle seat for a dog or other animal.

More particularly, in the invention relates to an animal seat which is shaped and dimensioned to facilitate the removable securing of the animal seat in position on an existing seat in an automobile or other vehicle.

Removable, portable car seats for children and for animals are well known in the art. Such car seats include a wide variety of hooks, slots, and openings for receiving a seat belt to anchor the car seat in place on a vehicle seat. Car seats for animals typically differ from car seats for children in two respects.

First, animal car seats often are taller, and inherently more unstable, than car seats for children.

Second, a car seat for a child includes a second seat belt or brace for securing the child in the car seat after the original seat belt in the vehicle is used to secure the car seat on a seat in the vehicle. In contrast, animals typically are "held" in a car seat only by a leash which is tied to the car seat. The leash ordinarily will not prevent an animal from being thrown out of the car seat when the vehicle stops quickly. When the animal is thrown out of the car seat, it likely will be injured.

Accordingly, it would be highly desirable to provide an improved animal car seat which could be more securely fastened in a vehicle and which would reduce the risk that an animal would be thrown from the seat.

Therefore, it is a principal object of the invention to provide an improved car seat for an animal.

A further object of the invention is to provide an improved animal car seat which is tensioned on installation in a vehicle in order to facilitate anchoring the seat in a desired position in the vehicle.

Another object of the invention is to provide an improved car seat which catches the body of an animal when an animal is thrown forward in the car seat.

These and other, further and more specific objects and advantages of the invention will be apparent to those skilled in the art from the following detailed description thereof, taken in conjunction with the drawings, in which:

FIG. 1 is a perspective view illustrating an animal car seat constructed in accordance with the principles of the invention;

FIG. 2 is a side view illustrating further construction details of the car seat of FIG. 1; and, FIG. 3 is a side section view illustrating the mode of operation of the car seat of FIGS. 1 and 2.

Briefly, in accordance with my invention, I provide improved vehicle seat apparatus for an animal. The seat apparatus is used in combination with an existing seat apparatus in a vehicle. The existing seat apparatus in a vehicle includes a generally horizontally oriented seat, and a generally vertically oriented backrest having a bottom adjacent the seat to form a separable junction between the seat and the backrest. The vehicle seat apparatus includes a housing having a top and a bottom; a recess in the top of the housing forming a seat for an animal; and, a flange extending around the bottom of the housing and including an upper surface and a bottom surface. The bottom surface contacts the seat. A portion of the flange extends into the separable junction intermediate the seat and backrest to secure the flange and resist movement of the flange upwardly away from the seat. A seat belt extends over the upper surface of flange to hold the housing against the back rest.

Turning now to the drawings which depict the presently preferred invention for the purpose of describing the use thereof and not by way of limitation of the scope of the invention, and in which like reference characters refer to corresponding elements throughout the several views, FIGS. 1 to 3 illustrate a vehicle seat apparatus for an animal. The seat apparatus is utilized in combination with an existing seat apparatus in a vehicle. The existing vehicle seat apparatus includes a generally horizontally oriented seat 21 and a generally vertically oriented backrest 20 having a bottom 24. Bottom 24 contacts and is adjacent the back of seat 21, although in some vehicles bottom 24 does not contact the back of seat 21 and is instead spaced away from seat 21. The back of seat 21 and bottom 24 form a separable junction. The junction is separable because if a book (or hand, or flange 16, or other object) is pushed between bottom 24 and seat 21, the book separates the bottom 24 from the seat 21. Such a separation occurs because bottom 24 and seat 21 typically are made from a resilient compressible material or materials.

An animal vehicle car seat constructed in accordance with the invention is generally indicated by reference character 10 and includes a housing 17 having a bottom 35 and a top 26. Circular flange 16 is attached to and extends outwardly away from bottom 35. Range 16 includes top surface 28 and bottom surface 29. A downwardly extending recess is formed in top 26. The recess includes horizontally oriented bottom 13 and a generally cylindrical side wall 18 extending between bottom 13 and elliptically shaped lip 14. Alphanumeric characters, drawings, photographs, or other indicia can be placed in inset 15 to identify the name of the canine or other animal which uses the seat 10, to identify the owner of the animal using the seat 10, to identify the home address of the owner of the animal, or to provide any other desired information. The length, indicated by arrows L, of oval lip 14 is presently about eighteen inches. The width, indicated by arrows W, is presently about 12 inches. A handle 11 extends across U-shaped opening 12. The leash of an animal can be secured to handle 11 when the animal is sitting or standing or lying on bottom 13.

While lip 14 and the recess formed in the top of seat 10 can have any desired shape and dimension, an oblong or elliptical shape is preferred because it tends to cause an animal to stand with its body parallel to the long axis (indicated by arrows L) of the recess and perpendicular to the forward direction of travel, indicated by arrow T, of a vehicle so that when the vehicle in which the animal is riding stops quickly, all or a majority of the length of one side of the animal is thrown against wall 18. When the length of one side of the animal's body is thrown against wall 18, the force generated when the animal's body strikes wall 18 is disseminated over a larger body area, making it less likely the animal will be injured. Seat 10 can, however, be positioned such that the long axis is parallel to the forward direction of travel T of a vehicle.

It is therefore preferred, but not necessary, that the depth, indicated by arrows H, of the recess formed in the top of housing 17 be sufficient to cause the chest or side of an animal to be positioned intermediate lip 14 and bottom 13 when the animal is standing and/or sitting on bottom 13. For example, the dog indicated by ghost outline 30 in FIG. 2 is standing in the recess on bottom 13 and has its chest positioned beneath lip 14.

FIG. 3 illustrates car seat 10 secured in position against seat 21 and backrest 20. A portion of the bottom surface 29 of flange 16 contacts and rests on seat 21. A portion of flange 16 extends into the separable junction 22 between the bottom 24 of seat 20 and the rear of seat 21. In many cars, bottom 24 contacts the rear 32 of seat 21 such that flange 16 resiliently compresses and separates portions of bottom 24 and of seat 21 when flange 16 is pushed into the junction 22 in the manner illustrated in FIG. 3.

Seat belt 25 is tightened around housing 17 above surface 28 and holds housing 17 in the position shown in FIG. 3 with flange 16 intermediate bottom 24 and seat 21 and with the rear of housing 17 pressed against backrest 20. Seat belt 25 preferably, but not necessarily, contacts and rests on surface 28. Belt 25 is secured to the floor or seat 21 of the vehicle in conventional fashion.

When flange 16 is positioned in the junction 22 between backrest 20 and seat 21 in the manner shown in FIG. 3, movement of the car seat 10 in the direction of arrow A is resisted because backrest 20 blocks and interferes with upward movement of flange 16 in the direction of arrow A. Further, sloped seat belt 25 generates a downward, rearward displacement force, indicated by arrows B and D, against the front of housing 17 and against the front portion of housing 17 and/or flange 16. The front of housing 17 and the front of flange 16 are positioned over the front 31 of seat 21 in FIG. 3. The rear of housing 17 and rear of flange 16 are positioned adjacent backrest 20. The displacement force D includes a horizontal component, indicated by arrow X, and a vertical component, indicated by arrow Y. The vertical component Y acts to force the front of flange 16 against the front 31 of seat 21 in the direction of arrow C. This, in turn, causes the rear portion of flange 16 to be displaced upwardly in the direction of arrow E against the bottom 24 of seat 20. Since backrest 20 is secured to seat 21 or to the vehicle frame, bottom 24 produces a downward force F which resists the movement of the rear portion of flange 16 upwardly in the direction of arrow E. Consequently, forces Y and F tension the bottom of seat 10 and produce a bending moment thereon. This bending moment is similar to the bending moment produced on a teeter-totter when each end of the teeter-totter is off the ground and a child is sitting on each end. When seat belt 25 is snugly tightened, the center of 33 of seat 21 often bunches up intermediate the front and back of flange 16 and of seat 21. The "bunched center" of seat 21 functions somewhat like the fulcrum of a teeter-totter. Such "center bunching" can occur when the seat has a "bucket" shape like that shown in FIG. 3, or when the top of the seat more closely parallels the ground as indicated by dashed line 24 in FIG. 3. The just-described tensioning of car seat 10 with seat belt 10 is an important feature of the car seat apparatus of the invention. The bunching of the center 33 of seat 21 is facilitated when the bottom 35 of seat 10 is at least somewhat elastic and can bow in the manner indicated by dashed lines 16A in FIG. 2 when forces C and F are applied to flange 16.

The bottom 13 of the recess in the top of housing 17 can be sloped in the manner indicated by dashed line 23 so that bottom 23 is parallel to the ground even though housing 17 is tilted on a seat 21 in the manner illustrated in FIG. 3.

Having described my invention in such terms as to enable those skilled in the art to understand and practice it, and having identified the presently preferred embodiments thereof.

I claim:

1. In combination with an existing seat apparatus in a vehicle, said seat apparatus including a generally horizontally oriented seat, and a generally vertically oriented backrest having a bottom adjacent said seat to form a separable junction between said seat and said backrest, the improvement comprising vehicle seat apparatus for an animal, said seat including (a) a housing having a top and a bottom;

(b) a recess in said top of said housing forming a seat for an animal; and, (c) a flange extending around the bottom of said housing and including a bottom surface contacting said seat and an upper surface, a portion of said flange extending into said separable junction intermediate said seat and backrest to secure said flange and prevent said flange from moving upwardly away from said seat; and, (d) a seat belt extending over said upper surface of said flange to hold said housing against said backrest.

* * * * *